May 13, 1952 W. RICHARDSON 2,596,823

RAILWAY TRACK SERVICING APPARATUS

Filed June 4, 1949 9 Sheets-Sheet 1

WITNESSES

Thomas W. Kerr, Jr.

A. J. Brittingham

INVENTOR:

William Richardson.,

BY Paul & Paul

ATTORNEYS.

WITNESSES
Thomas W. Kerr, Jr.
A. J. Brittingham

INVENTOR:
William Richardson.,
BY Paul & Paul
ATTORNEYS.

INVENTOR:
William Richardson.,
BY Paul & Paul
ATTORNEYS.

May 13, 1952 W. RICHARDSON 2,596,823

RAILWAY TRACK SERVICING APPARATUS

Filed June 4, 1949 9 Sheets-Sheet 4

WITNESSES

Thomas W. Kerr, Jr.

A. J. Brittingham

INVENTOR:

William Richardson.,

BY Paul & Paul

ATTORNEYS.

RAILWAY TRACK SERVICING APPARATUS

Filed June 4, 1949

9 Sheets-Sheet 5

WITNESSES

Thomas W. Kerr, Jr.

A. J. Brittingham

INVENTOR:

William Richardson.,

BY Paul & Paul

ATTORNEYS.

May 13, 1952 W. RICHARDSON 2,596,823

RAILWAY TRACK SERVICING APPARATUS

Filed June 4, 1949 9 Sheets-Sheet 6

WITNESSES

Thomas W. Kerr, Jr.

A. J. Brittingham

INVENTOR:
William Richardson.

BY Paul & Paul

ATTORNEYS.

May 13, 1952 W. RICHARDSON 2,596,823

RAILWAY TRACK SERVICING APPARATUS

Filed June 4, 1949 9 Sheets-Sheet 7

WITNESSES

Thomas W. Kerr, Jr.

A. J. Brittingham

INVENTOR:
William Richardson.

BY Paul & Paul

ATTORNEYS.

May 13, 1952 W. RICHARDSON 2,596,823

RAILWAY TRACK SERVICING APPARATUS

Filed June 4, 1949 9 Sheets-Sheet 8

WITNESSES
Thomas W. Kerr, Jr.
A. J. Brittingham

INVENTOR:
William Richardson.,
BY Paul & Paul
ATTORNEYS.

RAILWAY TRACK SERVICING APPARATUS

Filed June 4, 1949

WITNESSES

Thomas W. Kerr, Jr.

A. J. Brittingham

INVENTOR:

William Richardson.,

BY Paul & Paul

ATTORNEYS.

Patented May 13, 1952 2,596,823

UNITED STATES PATENT OFFICE 2,596,823

RAILWAY TRACK SERVICING APPARATUS

William Richardson, Edgewood, Pa.

Application June 4, 1949, Serial No. 97,232

19 Claims. (Cl. 104—2)

This invention relates to railway track servicing apparatus, that is to say, to apparatus useful in railway construction or maintenance to space the ties, to grasp and raise them from the track bed and to hold them against the rail bottoms, and to drive the rail securing spikes into them while so held.

The chief aim of my invention is to make it possible to carry out the above operations quickly and efficiently, and also economically as considered from the standpoint of labor costs.

This desiderata is realized in practice as hereinafter more fully disclosed, through provision of a mobile apparatus in the form of a car having flanged wheels for travel on the track rails, said car being equipped with reversible motor means for propulsion and for movement incident to tie spacing; with power operated means for grasping, raising and subsequently holding the ties firmly against the rail bottoms during spiking, both capable of control by a single operator from a control and observation seat on the car; and, with power operated hammers for use in driving the rail securing spikes into the ties. Thus, with my improved apparatus, only four men are required in addition to the operator above referred, to carry out the tie spacing, raising and spiking, i. e. two for setting the spikes while the ties are held in position, and two for driving the spikes with the aid of the power hammers; whereas the same amount of work when accomplished manually, as ordinarily heretofore, entailed the employment of at least a dozen or more men.

Other objects and attendant advantages will appear from the following detailed description of the attached drawings, wherein Fig. 1 is a perspective view of a railway track servicing apparatus conveniently embodying my invention, with its tie grasping and raising means or mechanism in elevated or travel position.

*The car*

Figure 4:
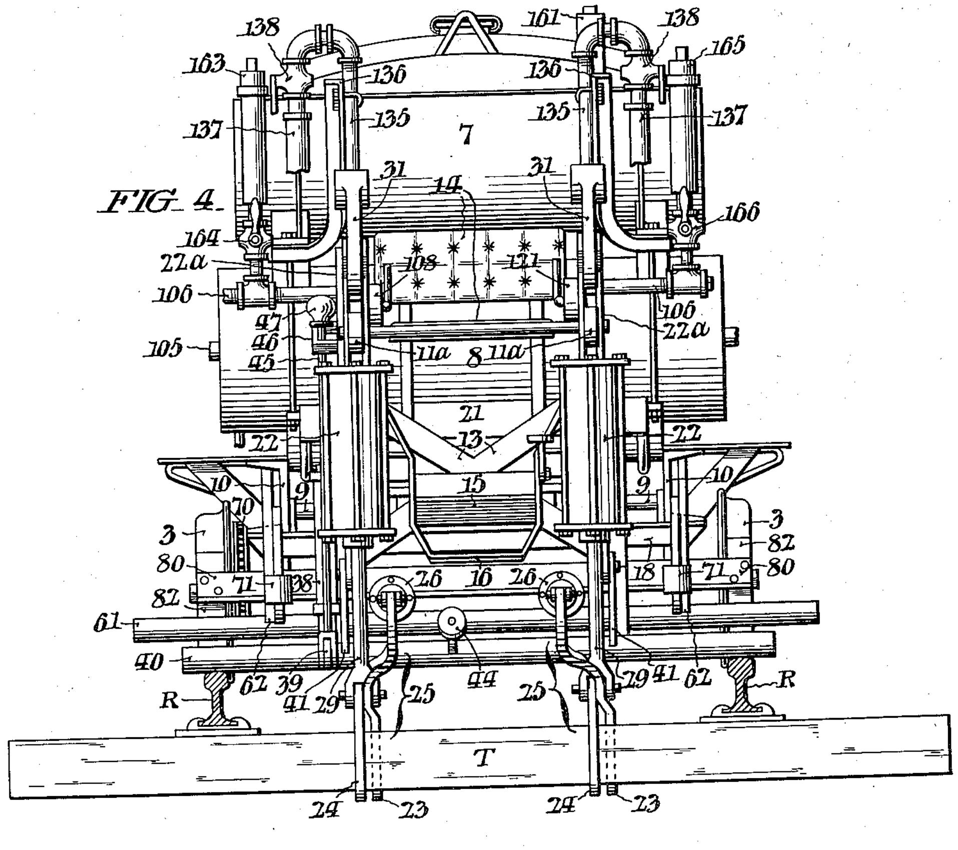
Fig. 4 shows the front elevation of the apparatus with the tie grasping and raising mechanism positioned as in Fig. 3.

As herein illustrated, my improved railway track servicing apparatus comprises a car 1 having a platform frame 2 supported by flanged front and rear wheels 3 and 4 for mobility on the track rails R. Mounted on the car is a power unit consisting, in this instance, of an internal combustion motor and a direct connected air compressor, these elements being indicated in outline at 5 and 6 respectively in Figs. 2 and 3. If the apparatus is to be used on electrified railways, an electric motor may be substituted for the internal combustion motor 5. Fuel for operating the motor 6 is supplied from a tank 7 supported above a compressed air storage reservoir 8 at the front end of the car.

*Tie raising mechanism*

Pivoted on a transverse shaft 9 which extends through the sill channels 10 of the car frame 2

Figure 8:
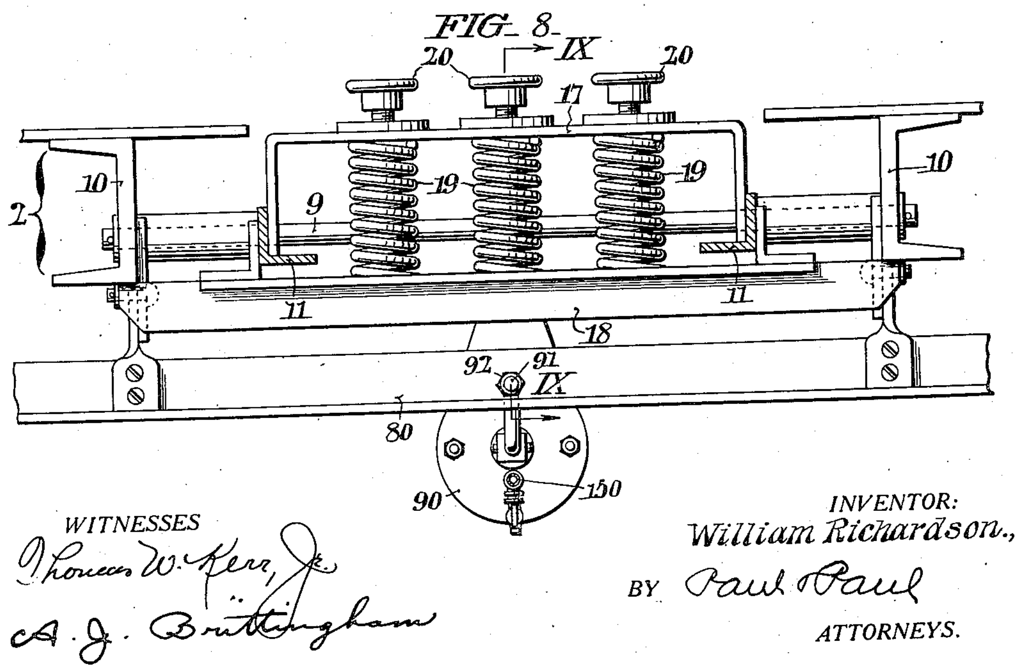
Fig. 8 is a fragmentary view in cross section taken as indicated by the angled arrows VIII—VIII in Fig. 2.
Figure 2:
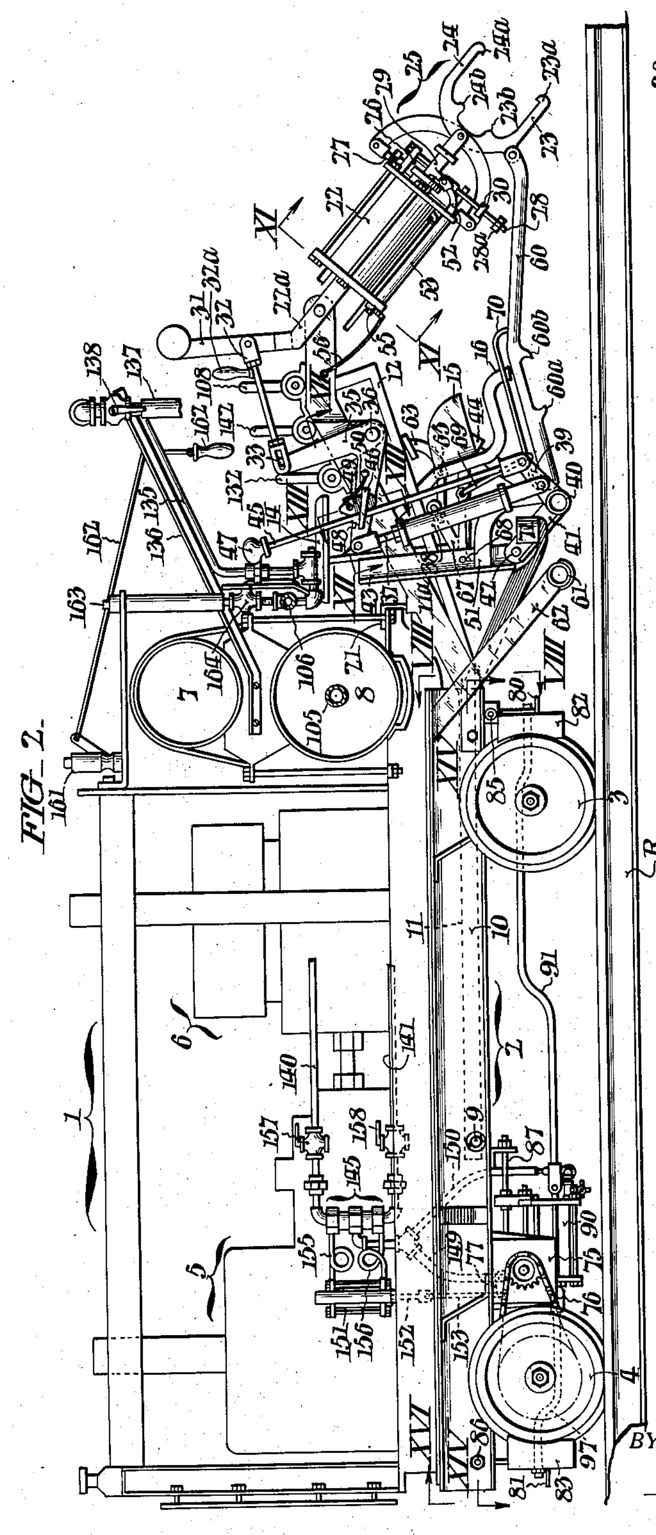
Fig. 2 shows the apparatus in side elevation.
Figure 10:
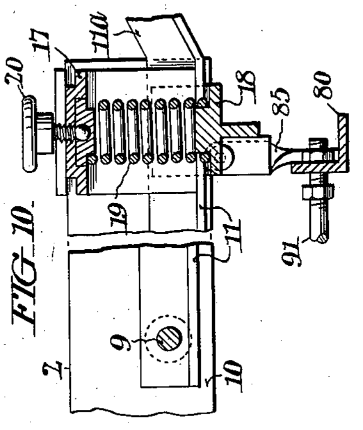
Fig. 10 is a view like Fig. 9 with certain parts differently positioned.
Figure 9:
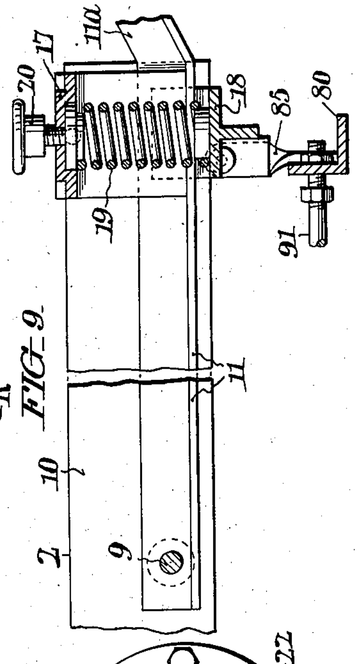
Fig. 9 is a fragmentary view in longitudinal section taken as indicated by the angled arrows IX—IX in Fig. 8.

(see Figs. 2, 3, and 8) about midway of the length of the latter, are the transversely spaced longitudinally arranged angle section side members 11 of a compositely constructed crane arm which extends forwardly and which is inclined upwardly beyond the car front as at 11a. The outboard portions of the side members 11 of the crane arm are reinforced from beneath by struts 12 (Figs. 2 and 3) and connected by crossed braces 13 (Fig. 4). Supported between the side members 11 of the crane arm is an operator's seat 14 with a pendent foot rest 15 and an approach step 16. As shown in Figs. 2 and 8, the side members 11 of the crane arm are further connected by a transverse bridge bar 17. Interposed between the bar 17 and a fixed plank 18 extending crosswise of the front ends of the sill channels of the car frame, is a plurality of helical compression springs 19 which are individually adjustable by means of hand screws 20. The crane arm is thus yieldingly supported with its side members 11 stopped by upward contact with a transverse angle bar 21 at the front end of the car 1 and with the cross rod 40 slightly above the rail tops normally as in Fig. 5.

Figures 3, 12, 13:
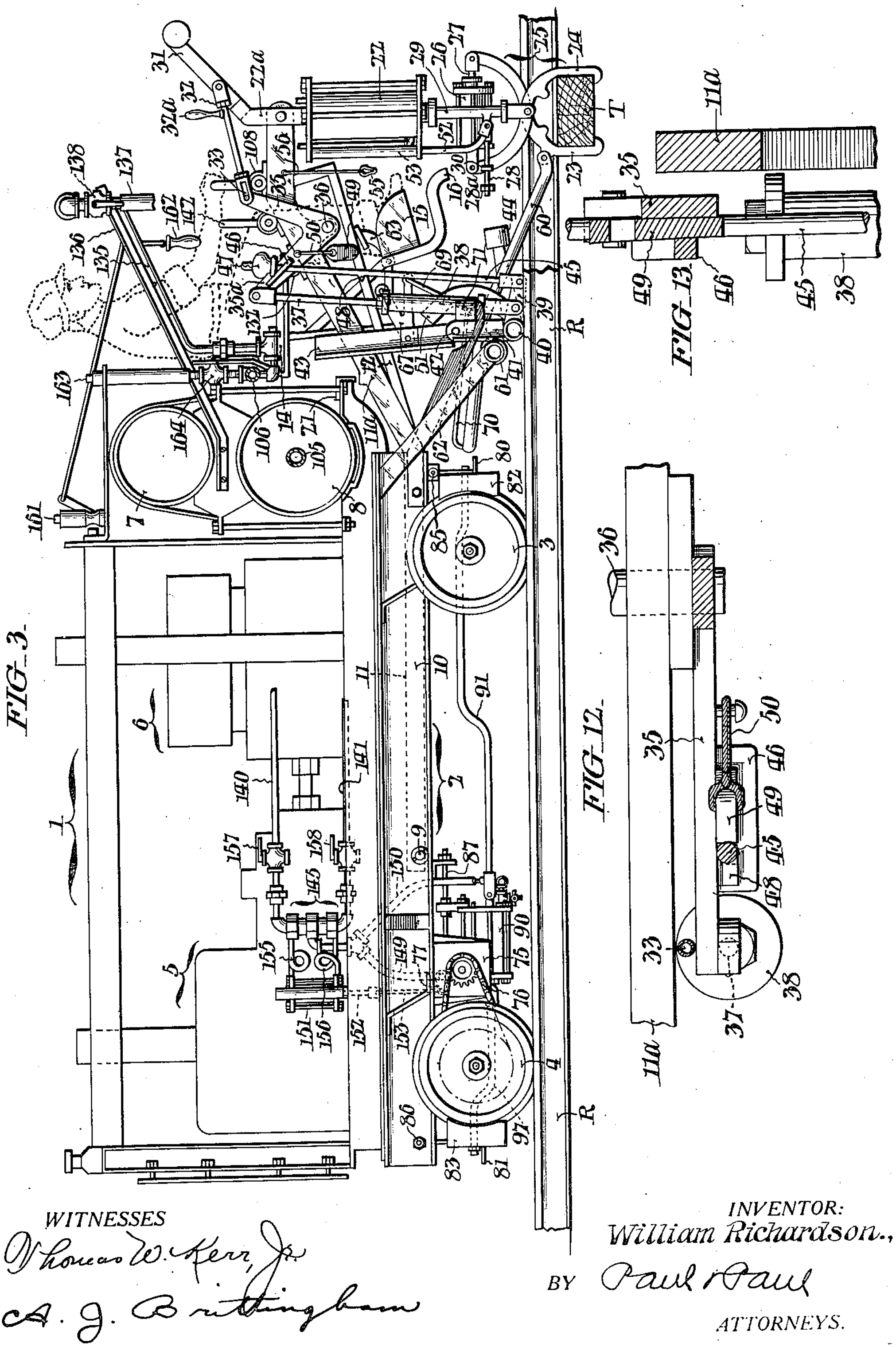
Fig. 3 is a side elevation like Fig. 2 with the tie grasping and raising mechanism in operating position.
Figs. 11, 12 and 13 are detail views in section taken as respectively indicated by the angled arrows XI—XI, XII—XII and XIII—XIII in Fig. 2.

Pivotally connected to the distal end of each side member 11 of the crane arm is the clevised suspension shank 22a of a pneumatic cylinder 22; and in turn pivoted to the distal end of the piston rod of each such cylinder are the crossed claws 23 and 24 of a pair of tie grasping tongs 25. As shown, the claws 23 and 24 have inwardly-directed hook ends 23a, 24a for capacity to underreach the tie as shown in Fig. 3, and, adjacent their common pivot connection are provided with stop lugs 23b, 24b for engaging the top of the tie T as in Fig. 5 when the tongs are lowered into operative position in a manner later explained. For the purpose of opening and closing the tongs 25, I have provided for each pair, a horizontally arranged pneumatic cylinder 26 which is pivoted at one end to the upward arm of the claw 24, and whereof the piston rod 27 is connected to the actuating arm of the claw 23. A control link 28, pivoted at one end to the piston rod 29, passes freely through an eye 30 in the actuating arm of claw 24 and has an adjustable stop nut 28a at its opposite end. Secured to the suspension shank 22a of each lift cylinder 22 is a weighted counterbalancing arm extension 31 which is inclined upwardly and forwardly from the pivot region. Through link rod 32, each counterweight extension 31 is coupled, with provision of a limited amount of lost motion by virtue of the slot at 33, to an arm 35 fixed upon the corresponding end of a rock shaft 36 which is rotatively supported on the side members 11a of the crane arm 11. The arm 35 at the side of the machine shown in Fig. 2 constitutes one extremity 35a of a bell crank whereof the other extremity is connected to the piston rod 37 of a vertically arranged pneumatic cylinder 38 which, at its lower end, is in turn pivotally connected to an arm 39 projecting forwardly from a cross rod 40. As shown in Figs. 1–4, the cross rod 40 is suspended by other arms 41 rigidly secured thereto, from pivots 42 on angle bars 43 pendent from the side members of the crane arm, said cross member being counterweighted at 44.

Figure 11:
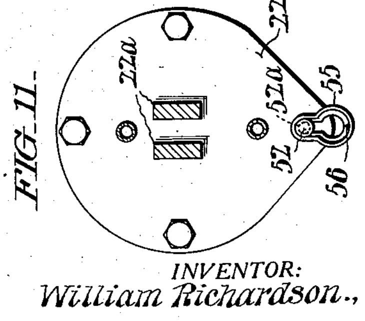
Figure 1:
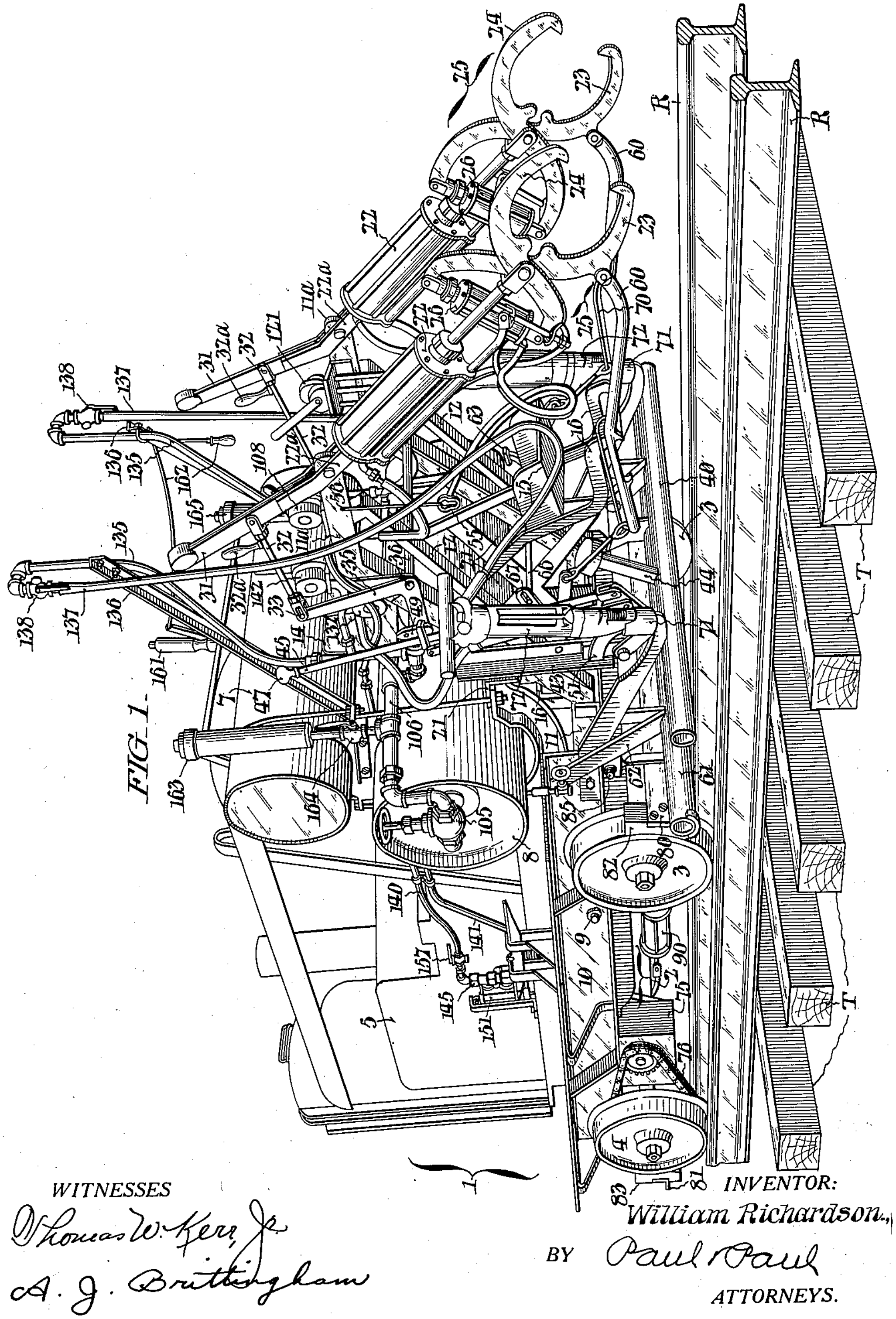

When the car is to be moved from one location of operation to another on the rails R, the cylinders 22 are maintained in the elevated angular position in which they are shown in Figs. 1 and 2 by means including a locking rod 45 which, at its lower end, is pivotally connected to the arm 39, on cross rod 40, and which extends upward through a slot on a lateral lug 46 on the extremity 35a of the bell crank 35 in Fig. 3. At its upper end, the rod 45 has a hand knob 47 within easy reach of the operator occupying the seat 14, and at an intermediate point said rod is provided with a spur 48 which is adapted to engage with the top of the lug 46 on the arm 35a of the bell crank 35. This engagement is maintained by a retractable wedge or keeper 49 inserted into the slot in the lug 46 on the arm 36a of bell crank 35 behind the rod 45. In order to prevent loss thereof, the keeper 49 is connected to the bell crank 35 by a cord or chain indicated at 50. The cylinders 22 and the respectively associated tongs 25 are elevated to the angular or travel position in which they are shown in Fig. 2 under power by actuation of the cylinder 38, concurrently with elevation of the cross rod 40 as far as permitted by engagement of arcuate stops 51 thereon, with the angle bars 43 as also shown in Fig. 2. Each pair of the tongs 25 is held retracted in travel position when the cylinders 22 are angularly elevated, by means including a locking rod 52 which is constrained to endwise movement in a guide tube 53 secured between the end heads of the corresponding cylinder 22. At its lower end, the locking rod 52 has a pivotal connection with the piston rod of the cylinder 22, and adjacent its upper end is provided with a circumferential groove 52a, see Fig. 5. When the tongs 25 are fully raised, the groove 52a of the rod 52 will be level with the top of the upper head of the cylinder 22, a keeper 55 with a button hole eye is applied over the protruding end of said rod and engaged in said groove see Fig. 11. Loss of the keeper 55 is insured as a consequence of its attachment, by a cord or chain 56, to the member 11 of the crane arm at the corresponding side of the apparatus. In addition to functioning as just explained, the locking rod 52 serves to prevent rotation of the piston rod 29 in the cylinder 22.

Figures 5, 6:
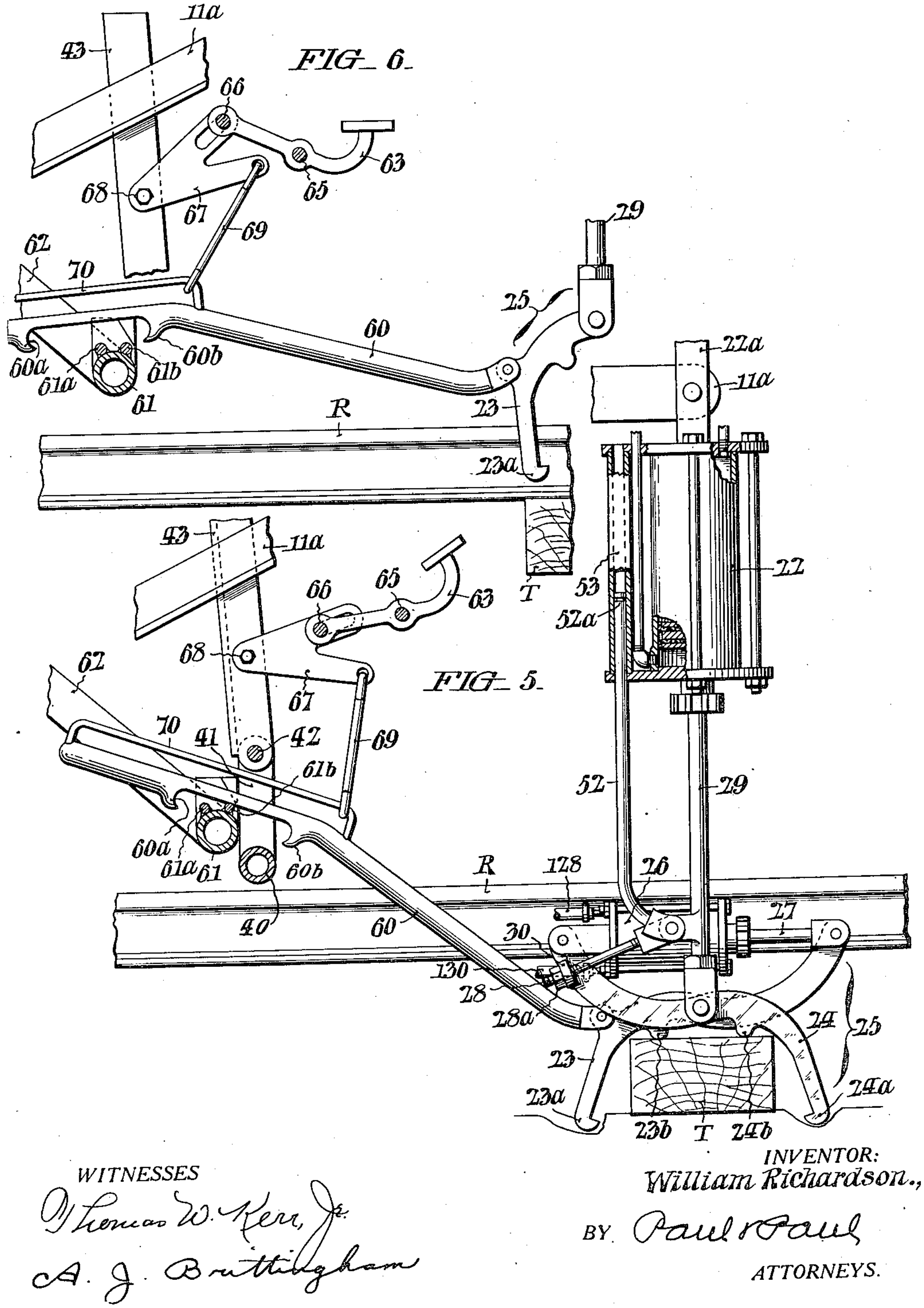
Fig. 5 is a fragmentary view in longitudinal section showing one of the tie grasping devices of the mechanism lowered onto the tie and opened in readiness to grasp it.
Fig. 6 is a view like Fig. 5 showing the grasping device in an intermediate position.

Pivotally connected at one end to the claw 23 of each pair of tongs 25 is a safety drag link 60 with a pair of spaced oppositely directed hook projections 60a and 60b which, under certain circumstances hereinafter explained, are adapted to engage respectively with lugs 61a and 61b on a cross bar 61 rigidly supported by forwardly and downwardly directed brackets 62 at opposite sides of the car frame. When in operative position with the cylinders 22 lowered, the drag links 60 rest on the rod 61 as shown in Fig. 5, but in preparation for elevating the cylinders 22 to travel position, they must be raised from engagement with said rod as shown in Fig. 6. The means for accomplishing this includes a treadle 63 which is medially fulcrumed on a pivot 65 at one side of the foot rest 15, the rearward arm of said treadle 63 having a pin and slot connection 66 with one extremity of a bell crank 67 fulcrumed at 68 on one of the angle bars 43. A lifting link 69, pivoted at one end to the other extremity of the bell crank 67, has its other end slidingly engaged with a longitudinally extending loop 70 on the rod 60. It is to be understood that the weight arms 31 on the suspension shanks 22a of the cylinders 22 counterbalance the weight of the drag links 60, so that said cylinders and the tongs 25 are normally maintained in true vertical position.

Affixed to the outer end of the bracket arm at each side of the car is a socket cup 71 (Figs. 1–4) for reception of a pneumatic hammer 72 which is to be used in spiking the tie.

*Propelling and brake mechanism*

Figure 14:
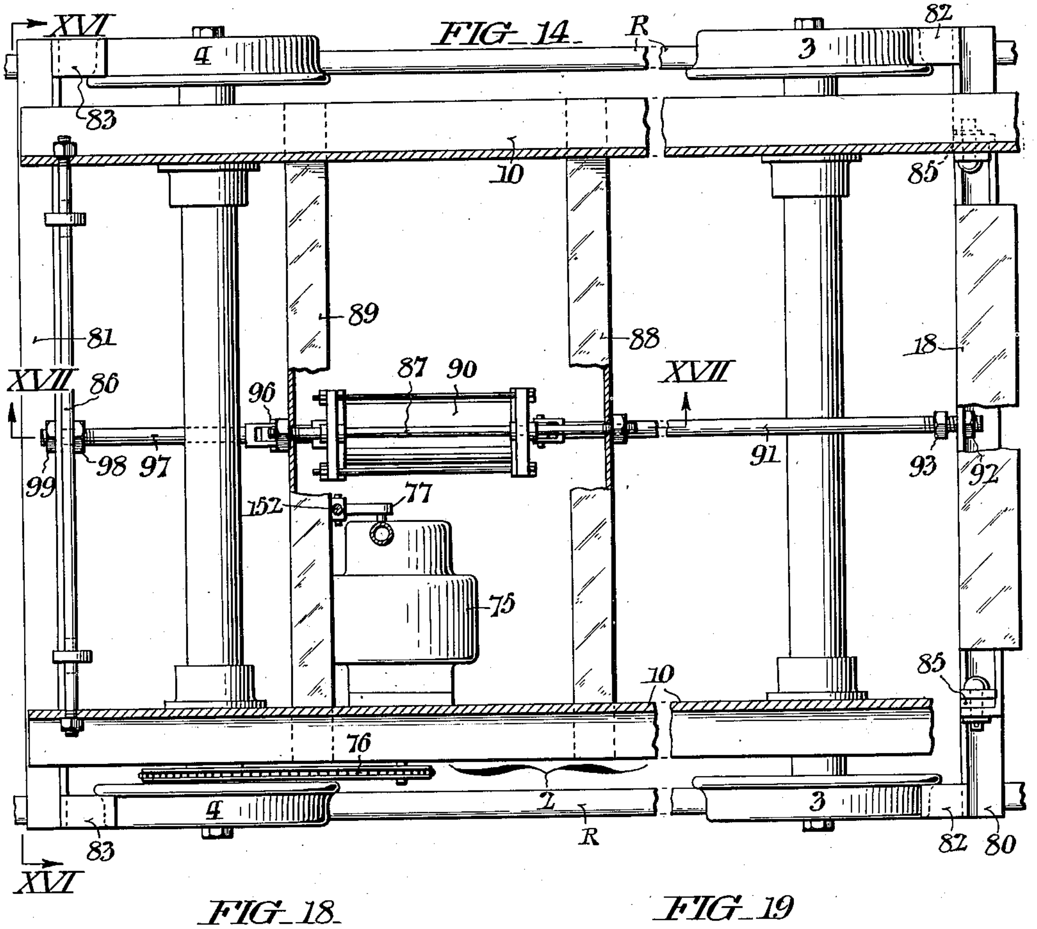
Fig. 14 is a broken out fragmentary view in horizontal section taken as indicated by the angled arrows XIV—XIV in Fig. 2 and showing the motor means for propelling the apparatus and brake mechanism associated therewith.

For propelling the apparatus, there is shown a compressed air motor 75 which, see Figs. 1, 2 and 14, is supported in suspension from the frame 2 of the car 1, and which is arranged to drive the axle of the rear wheels 4 through a sprocket chain 76. The motor 75 may be of any approved commercial type having a lever 77 by which it can be reversed to propel the car either forwards or backwards as required.

For the explanation of the brake mechanism, reference will be had more particularly to Figs. 2, 14, 16, and 17. As shown, this mechanism comprises brake beams 80 and 81 with shoes 82 and 83 for engaging the front and rear car wheels 3 and 4, said beams being pivotally suspended at 85 from the side sill channels 10 at the front end and a rod 86 extending crosswise between the side sill channels 10 of the car frame 2. Slidably suspended from a guide rod 87 extending between spaced transverse tie beams 88 and 89 (Fig. 17) of the car frame 2 in the longitudinal center of the car, is a brake actuating cylinder 90. To the front end of the brake cylinder 90 is pivotally connected a rod 91 which passes freely through an aperture centrally of the vertical flange of the front brake beam 80 and which is provided with spaced adjustable stop nuts 92 and 93 to react with opposite faces of said flange. The piston rod 95 of the cylinder 90 has a pivotal connection at 96 with an extension rod 97 which passes freely through a central aperture in the vertical flange of the rear brake beam 81, and which is provided with spaced adjustable stop nuts 98 and 99 which react with the opposite faces of said flange. As shown, the piston 100 of cylinder 90 is subject to the action of a spring 101 which serves normally to maintain the brake shoes 82 and 83 in engagement with the wheels 3 and 4.

*Compressed air distribution and control means*

Figure 7:
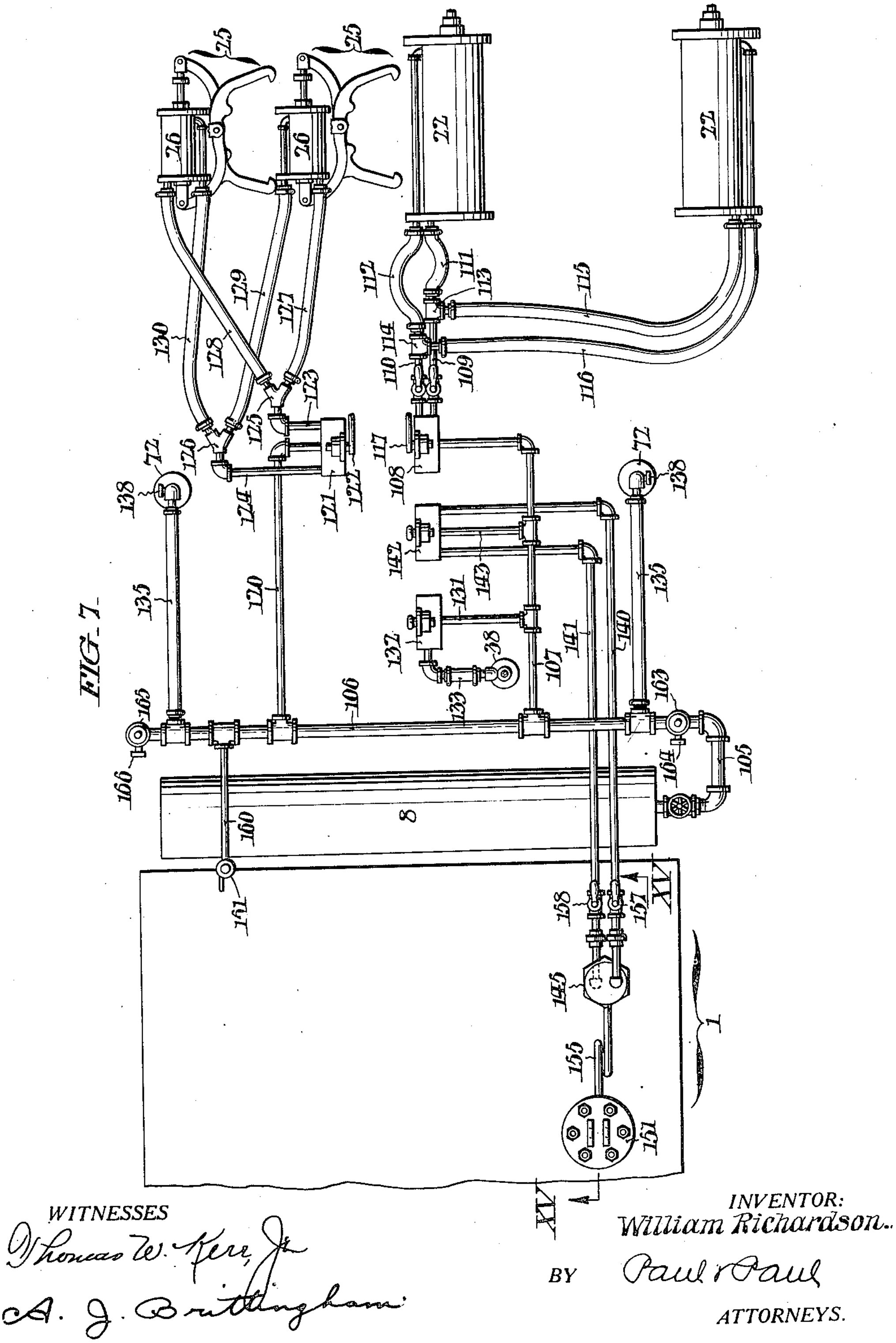
Fig. 7 is a diagrammatic view in top plan showing the means by which the propelling means and the tie grasping and raising mechanism are actuated and controlled from the car.
Figures 15, 20:
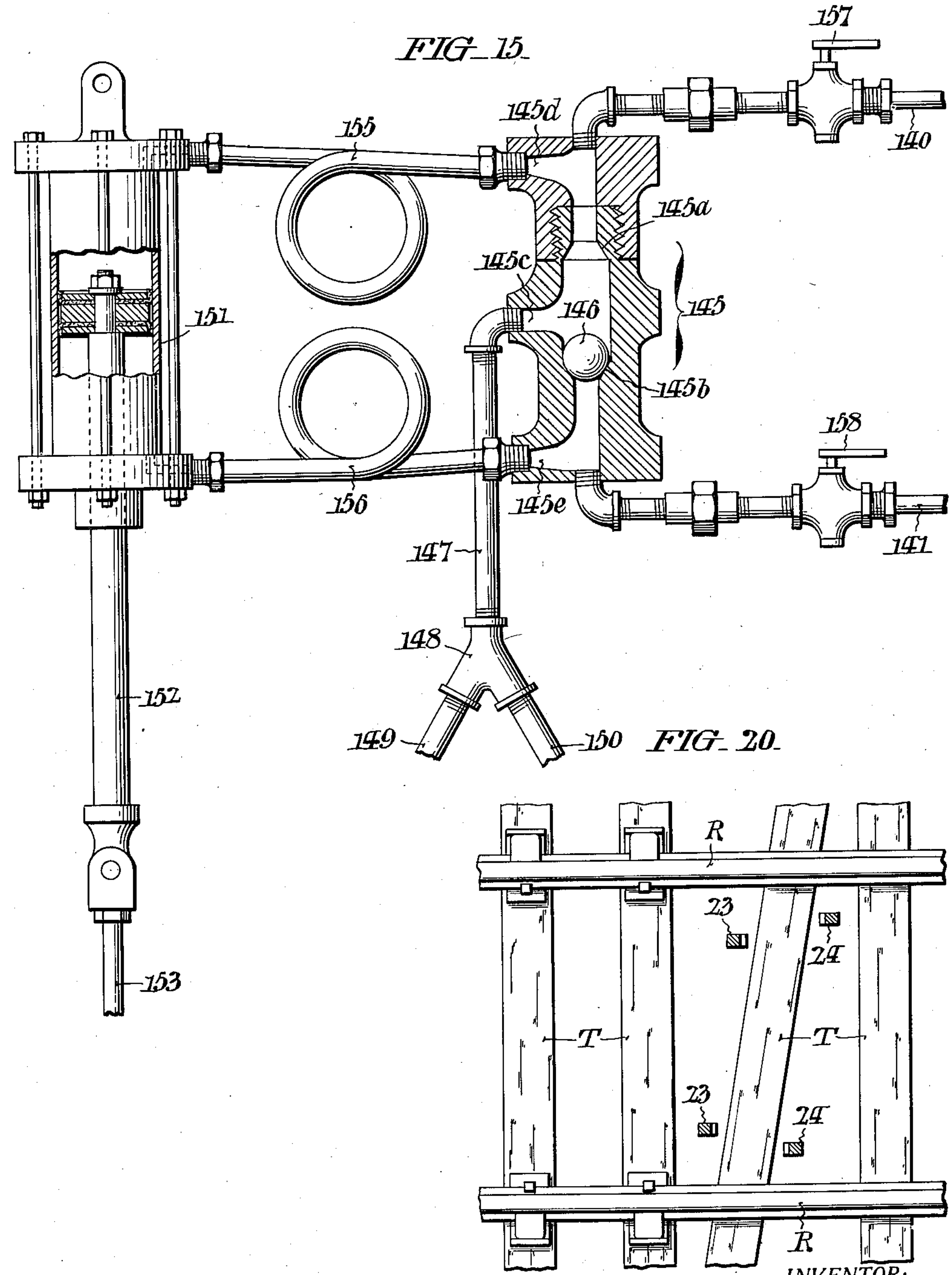
Fig. 15 is a fragmentary view partly in elevation and partly in vertical section taken as indicated by the angled arrows XV-XV in Fig. 7.
Fig. 20 is a fragmentary plan view showing the grasping devices positioned in readiness to pick up a tie lying askew on the track bed.
Figure 17:
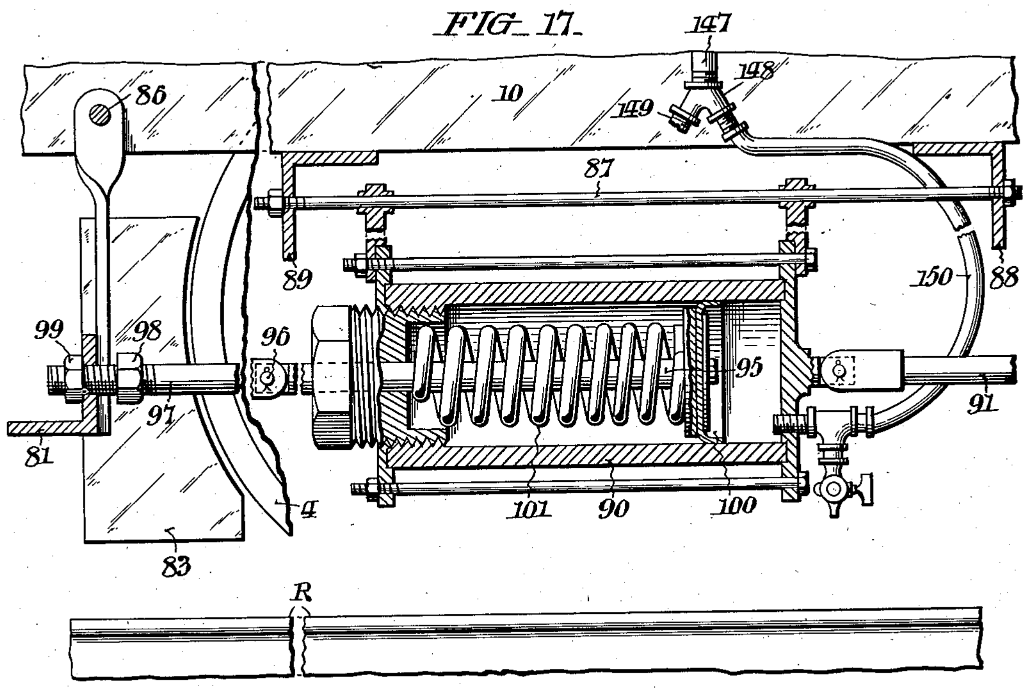
Fig. 17 is a broken out fragmentary view in longitudinal section taken as indicated by angled arrows XVII—XVII in Figs. 14 and 16.
Figure 16:
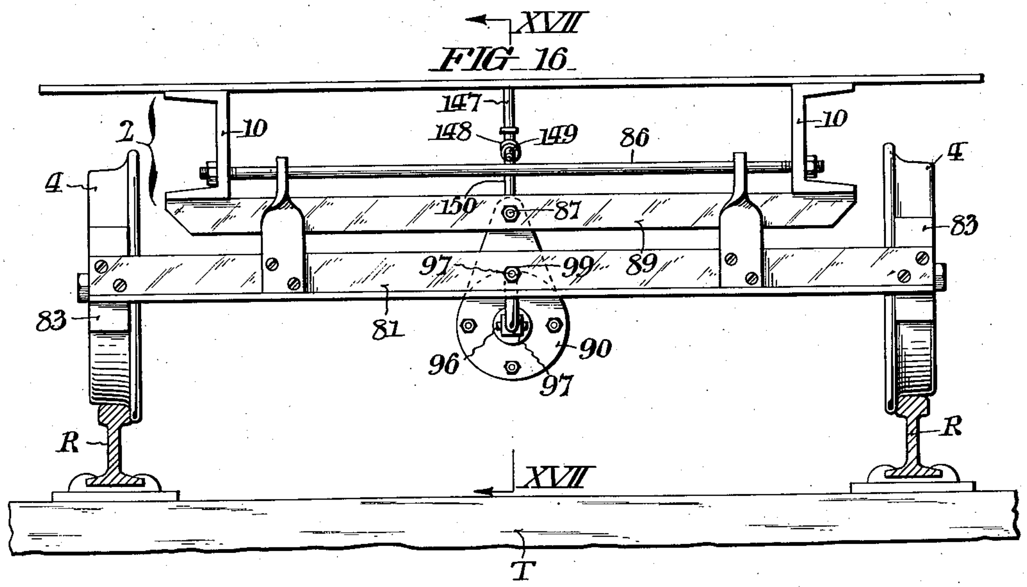
Fig. 16 shows the rear elevation of the apparatus looking as indicated by the angled arrows XVI—XVI in Figs. 2 and 14.

For the description of the conduit system for conducting the compressed air used in actuating the various pneumatically operated instrumentalities hereinbefore referred to, reference will now be had to Figs. 1 and 7 of the drawings. Leading from one end of the air reservoir 8 is a pipe 105 which connects with a cross main 106, and extending forwardly from this cross main is a branch 107 which extends to a manual control valve 108 on one side member 11 of the crane arm within the reach of the operator occupying the seat 14, for controlling the supply of compressed air to the tong lifting cylinders 22. Extending from the valve 108 are short pipes 109 and 110 which, by flexible conduits 111 and 112 are connected to ports at opposite ends of one tong lifting cylinder 22, and interposed in them are T fittings 113 and 114 with flexible conduits 115, 116 leading respectively to ports at the corresponding ends of the other tong lifting cylinder. The valve 108 is operable by means of a hand lever 117, and it is to be understood, is of a suitable type by which the discharge of compressed air can be selectively diverted for flow through the pipe 110 into the lower ends of the cylinders 22 when the tongs 25 are to be raised, or through the pipe 109 and into the upper ends of said cylinders when the tongs are to be lowered in manipulating the ties. Also extending forwardly from the cross main 106 is a second branch pipe 120 which leads to a control valve 121 on the other side member 11 of the crane arm. The valve 121 is identical with the valve 108 and has an actuating hand lever 122 likewise within easy reach of the operator occupying the seat 14. Extending from the valve 121 are air delivery pipes 123, 124 which terminate in Y fittings 125, 126 from which flexible conduits 127, 128 and 129, 130 extend respectively to opposite ends of the tong claw actuating cylinders 26. Connected to the branch pipe 107 is a pipe 131 which leads to still another hand valve 132 for controlling admission and exhaust of compressed air, through a flexible tube 133, to the cylinder 38 by which the tong raising cylinders 22 are swung forwardly to the angular or travel position of Fig. 2 when the car is to be propelled over relatively long distances from one location of operation to another. Extending first upwardly and then forwardly at a rising angle from the cross main 106 at opposite sides of the apparatus, are branch pipes 135 which are supported by angle posts 136 on the car, and from the terminals of which flexible conduits 137 extend to the spike driving hammers 72, the supply to said hammers being controllable by hand valves indicated at 138. Compressed air is conducted to the propelling motor 75 and the brake cylinder 90 by way of two pipes 140 and 141 (Fig. 7) which extend rearwardly from a control valve 142 located at the station of the operator occupying the seat 14 and which are in communication, through a pipe 143, with the branch 107. As shown in Figs. 7 and 15, the pipes 140 and 141 respectively connect into the top and bottom ends of a vertical axis valve 145 with seats 145*a* and 145*b* for a closure ball 146 above and below a central outlet port 145*c*. Extending downward from the delivery port 145*c* of valve 145 is a short pipe 147 which terminates in a Y fitting 148. Connected to this fitting 148 are pipes 149 and 150, whereof the former extends to the propelling motor 75, and whereof the latter to the front end of the brake actuating cylinder 90. For the actuation of the reversing arm 77 of the propelling motor 75, I have provided a vertically-arranged double acting cylinder 151 whereof the piston rod 152 is coupled with said arm through a link 153, as best shown in Fig. 2. Through coiled tubes 155 and 156, ports at the top and bottom ends of the cylinder 151 are connected with lateral ports 145*d* and 145*e* at corresponding ends of the valve 145. By means of auxiliary hand valves 157 and 158 interposed in the pipes 140 and 141, it is possible to control the propelling motor 75 and brake application from the platform of the car 1. From the main 106 also extends another branch 160 that leads to a signal whistle 161 which is operable by means of a pull cord 162 from the operator's seat 14. At 163 is indicated a gravity discharge reservoir from which lubricating oil may be released, from time to time, into the piping under control of a hand valve 164. A gravity discharge reservoir 165 is also provided from which an anti-freeze solution may be released into the air system under control of a hand valve 166 to facilitate the use of the apparatus in winter.

*Operation*

To prepare the apparatus for action, the operator first presses the foot pedal 63 whereby, through the intervening connections 67 and 69, the drag links 60 are lifted and held clear of the fixed cross bar 61 as in Fig. 6. He next withdraws the keeper wedge 49, and then shifts the rod 47 to retract its spur 48 from the lug 46 on bell crank lever 35, with the result that the cylinders 22 are released and, together with the tongs 25, swing down by gravity to vertical position, the drop being cushioned by exhaust of air from the cylinder 38. At the same time, the cross rod 40 will move downward about the pivots 42 of its supporting arms 41 under the influence of the counterweight 44 and come to rest with said arms vertical and buttressed by the fixed cross rod 61 as in Fig. 3. With this preparation, the motor and brake control valve 142 is manipulated by the operator for shifting of the car either forwards or backwards as may be required to approximately center the grasp tongs 25 over the tie T which is to be raised and spiked. Then, under control of hand valve 121, air is admitted to the cylinders 26 to open the tongs 25, after which the valve 108 is operated for admission of air to the tops of the cylinders 22 for lowering of the tongs. In this action, the claw ends of the open tongs are forced into the track ballast beyond opposite sides of the tie T as shown in Fig. 5, leveling of the tongs being automatically effected incidentally by contact of the lugs 23*b*, 24*b* with the top of the tie.

The hand valve 121 is then again manipulated by the operator to admit air to the opposite ends of the cylinders 26 whereby the tongs 25 are closed to grasp the tie which is then raised into contact with the rail bottoms as in Fig. 3 through admission of air into the bottoms of the cylinders 22 under control of the hand valve 108. Incident to raising of the tie in the manner just explained, it will be seen that, by action of the cylinders 22, the crane arm 11 will be drawn downward against the resistance of the springs 19 (Fig. 8), this movement being however, slight and limited by engagement of the cross rod 40 with the rail tops as also shown in Fig. 3. The rod 40, together with its suspension arms 41 and the upright bars 43 to which said arms are connected, thus serves as an effective supporting brace means beneath the crane arm at a point intermediate the ends thereof. If necessary at this stage to properly space the grasped tie T relative to an adjacent previously spiked tie, the pressure in the cylinders 22 is slightly relieved temporarily and the car maneuvered forwards or backwards to the extent required. With the tie T now firmly held to the rail bottoms as in Fig. 3, the pneumatic hammers 72 (Fig. 1) are removed from their socket supports 71 on the crane arm and used to drive the usual rail securing spikes into the tie. After the tie is spiked, the tongs are first opened and then raised by means of the cylinders 26 and 22 under control of the valves 121 and 108 respectively, and the apparatus moved under power along the rails into position for repetition of the above operations upon another tie.

Figure 18:
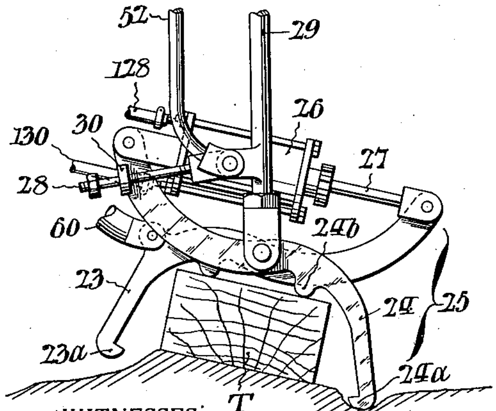
Figs. 18 and 19 are fragmentary views corresponding to Fig. 5 showing how the grasping devices function in engaging a tie disposed in a canted position.
Figure 19:
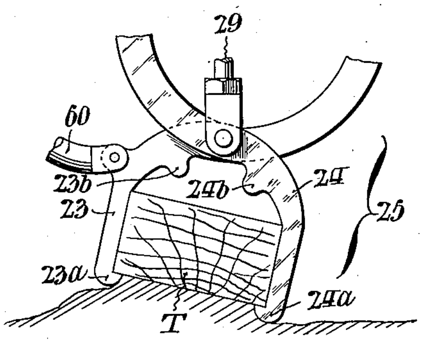

In the event that the tie should be canted as in Figs. 18 and 19, the claws 23, 24 of the tongs will take accommodating positions by movement about their common connecting pivot as the lugs 23*b*, 24*b* on them engage the top of the tie. After closing of the tongs as in Fig. 19, and subsequent rise thereof, they will swing reversely on the common claw pivots so that the tie will be leveled as it approaches the rails.

By pushing or pulling upon the handles 32*a* on the links 32, the operator is able to swing the individual cylinders 22 slightly about their suspension pivots in either direction so that the tongs 25 may be centered over a tie placed slightly askew as in Fig. 20. Upon subsequent release of the cylinders 22 as the tie is raised, they will automatically re-assume their true vertical positions and said tie be thereby brought into right angular relationship to the rails R.

Ordinarily the drag links 60 simply slide back and forth upon the fixed cross rod 61, and therefore perform no useful function. However, in the event that the operator should inadvertently start the apparatus rearwardly, for example, while the tongs 25 are down, the projections 60*a* on the drag links 60, by engagement with the projections 61*a* on the cross bar 61, will limit the movement of the cylinders 22 about their suspension pivot upon encounter of the tongs with the ties. By this encounter the propelling motor 75 will be stalled and bending or injury to the piston rods 29 of the cylinders 22 prevented by the buttressing action of the drag links 60. In a similar way injury will be prevented to the piston rods in the event that the apparatus is inadvertently started forward, through engagement of the lugs 60*b* on the drag links 60 with the projections 61*b* on the fixed cross rod 61, as will be readily understood.

The construction and arrangement of the propelling and braking mechanism is such that the brakes are automatically released instantly at starting of the motor 75, and instantly applied automatically when the air supply to said motor is interrupted, so that the apparatus can be shifted either forwards or backwards by small increments in centering the tongs 25 over the ties, as well as in spacing the latter. Thus when the control valve 142 is operated to permit flow of air by way of pipe 140 (Figs. 2 and 7) into the top of the automatic ball valve 145 (Fig. 15), the air finds its way through the tube 155 into the top of the cylinder 151, with the result that the piston in said cylinder is depressed to actuate the lever 77 of the motor 75 which is thereby set for rotation to propel the car 1 forwardly. At the same time air flows from the automatic valve 145 through the pipe 147 and its branches 149 and 150 respectively to the motor 75 to drive the same and into the cylinder 90 (Figs. 14 and 17) whereby, through the rods 91, the brake beams 80 and 81 are swung outwardly to withdraw the brake shoes 82 and 83 from the car wheels 3 and 4. Upon subsequent interruption of the air flow under control of the hand valve 142, the brakes are instantly set by the action of the spring 101 upon the piston in the cylinder 90. On the other hand, when the control valve 142 is operated to permit flow of air by way of the pipe 141 (Figs. 2 and 7) into the bottom of the automatic valve 145, the ball in the latter is forced upward onto its seat 145*a*. As a consequence, the air is now diverted through the tube 156 into the lower end of the cylinder 151 whereby the piston in the latter is forced upward to shift the lever 77 of the motor 75 and to set the latter for reverse rotation and backward propulsion of the car. Here again as before, part of the air flows from the automatic valve 145 by way of the pipe 147 and its branches 149 and 150 respectively to the motor to drive it, and to the cylinder 90 to effect concurrent release of the brakes in the same manner as above explained.

Having thus described my invention, I claim:

1. In railway track servicing apparatus, a wheeled car adapted for mobility on the track rails; a crane arm extending forwardly from one end of the carriage; tie grasping tongs suspended from a transverse axis pivot at the distal end of the crane arm; means for lowering and raising, and for opening and closing the tongs; means for swinging the tongs upwardly to an angular position about the pivot clear of the track when the apparatus is to be propelled relatively long distances from one locality to another on the rails; and means for locking the tongs in such angular position.

2. In a railway track servicing apparatus, a wheeled car adapted for mobility on the rails; a crane arm extending forwardly from one end of the car; multiple tie grasping tongs independently suspended from a transverse pivot axis at the distal end of the crane arm; manually controlled power means for lowering and raising the tongs relative to the crane arm and for opening and closing the tongs; and means whereby the tongs may be individually moved about the suspension pivot axis as and for the purpose described.

3. In a railway track servicing apparatus, a wheeled car adapted for mobility on the track rails; a crane arm fulcrumed on a transverse axis on the car and extending forwardly and upwardly at an angle from one end of the car and having a rail engaging cross bar connected thereto at an intermediate point in its length; spring means acting upwardly upon the crane arm for maintenance of its cross bar slightly above the rails normally; tie grasping tongs suspended from the distal end of the crane arm; and manually controlled power means for lowering and raising the tongs relative to the crane arm and for opening and closing them.

4. Railway track servicing apparatus, according to claim 3, wherein the cross bar has suspension arms pivotally connected to the crane arm, further including means for swinging the cross bar about the pivotal connection of its suspension arms to a position well above the rails when the apparatus is to be propelled relatively long distances from one location to another on the rails.

5. In a railway track servicing apparatus, a wheeled car adapted for mobility on the track rails; a crane arm extending forwardly from one end of the car; a vertical axis cylinder suspended from the distal end of the crane arm; tie grasping tongs with interpivoted claws at the lower end of the piston rod of the cylinder; a horizontal axis cylinder pivotally connected at one end to an actuating arm on one claw and its piston rod pivotally connected to an actuating arm on the other claw; a pressure fluid supply source on the carriage; and manually controlled means for selectively controlling admission of fluid pressure to opposite ends of the vertical axis cylinder to lower and raise the tongs, and for selectively controlling admission of fluid pressure to the opposite ends of the horizontal axis cylinder to open and close the tongs.

6. Railway track servicing apparatus, according to claim 5, wherein the tong lowering and raising cylinder is suspended from a transverse pivot on the crane arm; further including lift means for swinging the vertical axis cylinder upwardly to an angular travel position; and means for holding said cylinder in such position with the tongs clearing the track when the apparatus is to be moved relatively long distances from one location to another on the track rails.

7. Railway track servicing apparatus, according to claim 5, wherein the tong lowering and raising cylinder is connected by a transverse pivot to the crane arm; further including lift means for swinging the vertical axis cylinder upwardly to an angular travel position with the tongs clearing the track when the apparatus is to be propelled relatively long distances from one location to another on the track rails, said lift means comprising a crosswise rock shaft on the crane arm, a lever on the rock shaft, a vertically arranged cylinder carried by the crane arm, and interposed linkages between the piston rod of the latter cylinder and the tong lowering and the lever; manual control means for admitting fluid pressure to the vertically arranged cylinder; and holding means comprising a locking rod having a pivotal connection with the linkage said rod extending through a slot in a lateral lug on the lever and having a spur engageable over said lug after the tong lowering and raising cylinder is swung to its angular travel position.

8. Railway track servicing apparatus, according to claim 5, further including means for locking the piston rod of said cylinder in its retracted position with the tongs elevated to clear the track ties when the apparatus is to be propelled relatively long distances from one location to another on the track rails.

9. Railway track servicing apparatus, according to claim 5, further including means for locking the piston rod of the cylinder in its retracted position with the tongs elevated to clear the track ties when the apparatus is to be propelled relatively long distances from one location to another on the track rails, said locking means comprising a parallel slide rod connected to the lower end of the piston rod and endwise shiftable in guide means exteriorly of the cylinder, and a keeper on the cylinder engageable into a lateral notch in the locking rod when the piston rod is retracted.

10. Railway track servicing apparatus, according to claim 5, wherein the tong lowering and raising cylinder is connected by a transverse pivot to the crane arm, and further including a fixed cross rod supported from the car beneath the crane arm above the rails; a drag link pivotally connected to one of the tong claws and extending rearwardly over the fixed bar, said links having spaced stop projections adapted for respectively engaging the opposite sides of said rod to limit movement of the cylinder about its pivotal suspension as and for the purpose described.

11. Railway track servicing apparatus, according to claim 5, wherein the tong raising and lowering cylinder is connected by a transverse pivot to the crane arm, and further including a fixed cross rod supported from the car beneath the crane arm above the rails; a drag link pivotally connected to one of the tong claws and extending rearwardly over the fixed cross rod, said link having spaced stop projections for respectively engaging the opposite sides of said rod to limit movement of the cylinder about its pivotal suspension as and for the purpose described; means whereby the tong lowering and raising cylinder can be swung forwardly and upwardly into an angular position and so locked with the tongs clear of the track when the apparatus is to be propelled relatively long distances from one location to another on the rails; and means for lifting the drag link free of the fixed cross rod to permit swinging of the tong lowering and raising cylinder to travel position as aforesaid.

12. In a railway track servicing apparatus, a wheeled car adapted for mobility on the track rails; a crane arm extending forwardly and upwardly at an inclination from one end of the car; tie grasping tongs suspended from the distal end of the crane arm; means for lowering and raising and for opening and closing the tongs; a seat from which the position of claws can be observed at all times from above by an operator; and means accessible at said seat for manually controlling the tong lowering and raising and opening and closing means.

13. In a railway track servicing apparatus, according to claim 12 wherein the crane arm comprises two cross connected side members; and wherein the seat for the operator is supported between the side members of the crane arm.

14. In a railway track servicing apparatus, according to claim 12, further including reversible motor means for propelling the car; and other manual means accessible at the operator's seat for controlling the motor means.

15. Railway track servicing apparatus, according to claim 1, having duplicate tie grasping tongs of the character defined, laterally spaced to engage the ties inwardly adjacent the respective track rails.

16. Railway track servicing apparatus, according to claim 1, having duplicate tie grasping tongs of the character defined, laterally spaced to engage the ties inwardly adjacent the respective track rails; and separate means for individually raising and lowering and for opening and closing the tongs.

17. In railway track servicing apparatus, a wheeled car for mobility on the track; a crane arm extending forwardly from one end of the car; a suspension pivotally connected to the distal end of the crane arm; tie grasping tongs and means for opening and closing said tongs carried by the suspension; means for raising and lowering the crane arm; and means whereby the suspension may be swung forwardly or rearwardly on its pivot.

18. Railway track servicing apparatus according to claim 17, having duplicate tie grasping tongs, laterally spaced to engage the ties inwardly adjacent the respective track rails.

19. Railway track servicing apparatus according to claim 17, having duplicate tie grasping tongs, laterally spaced to engage the ties inwardly adjacent the respective rails; and separate means for individually operating and controlling the tongs.

WILLIAM RICHARDSON.

REFERENCES CITED

The following references are of record in the file of this patent:

UNITED STATES PATENTS

| Number | Name | Date |
|---|---|---|
| 936,679 | Spandau | Oct. 12, 1909 |
| 1,321,909 | Hastings | Nov. 18, 1919 |